E. A. JOHNSTON & E. J. KANE.
TRACTOR.
APPLICATION FILED FEB. 11, 1915. RENEWED MAY 17, 1918.

1,299,190.

Patented Apr. 1, 1919.
2 SHEETS—SHEET 1.

Witnesses:
J. N. Daggett.
Chas. L. Byron

Inventors.
Edward A. Johnston.
AND
Edmund J. Kane.
by Chas. E. Lord, Atty.

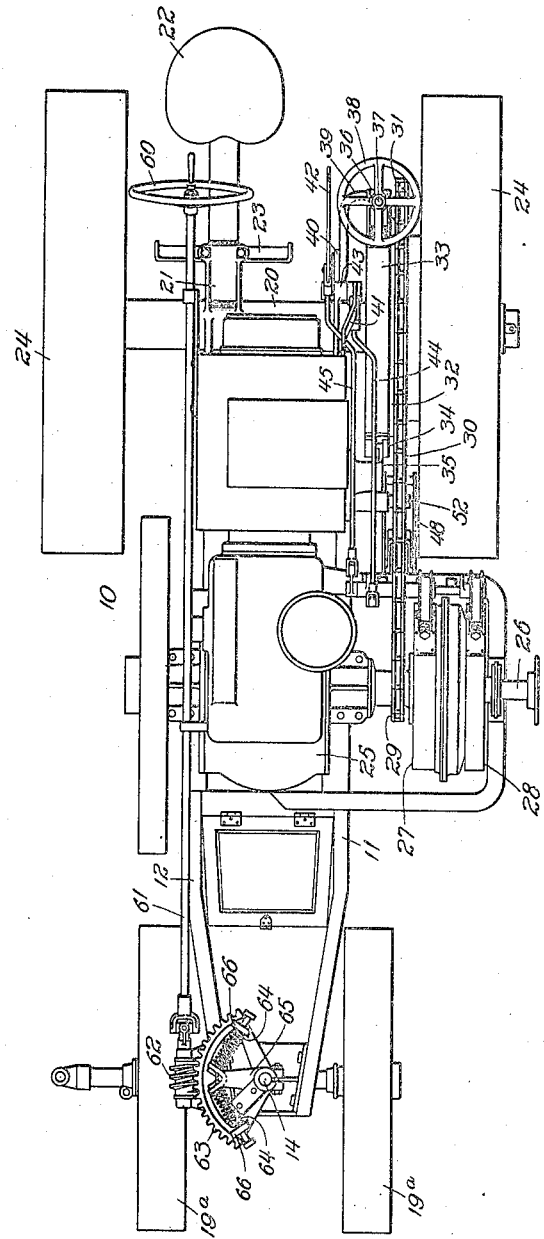

UNITED STATES PATENT OFFICE.

EDWARD A. JOHNSTON AND EDMUND J. KANE, OF CHICAGO, ILLINOIS, ASSIGNORS, BY MESNE ASSIGNMENTS, TO INTERNATIONAL HARVESTER COMPANY, A CORPORATION OF NEW JERSEY.

TRACTOR.

1,299,190.          Specification of Letters Patent.          Patented Apr. 1, 1919.

Application filed February 11, 1915, Serial No. 7,470. Renewed May 17, 1918. Serial No. 235,207.

*To all whom it may concern:*

Be it known that we, EDWARD A. JOHNSTON and EDMUND J. KANE, citizens of the United States, and residents of Chicago, in the county of Cook and State of Illinois, have invented certain new and useful Improvements in Tractors, of which the following is a full, clear, and exact specification.

This invention relates to tractors.

The objects of the invention are to provide a simple, inexpensive, compact and durable tractor, and one that is efficient in operation.

These objects are accomplished by providing the construction disclosed in the accompanying drawings, in which—

Fig. 2 is a plan view of the same.

Figure 1:
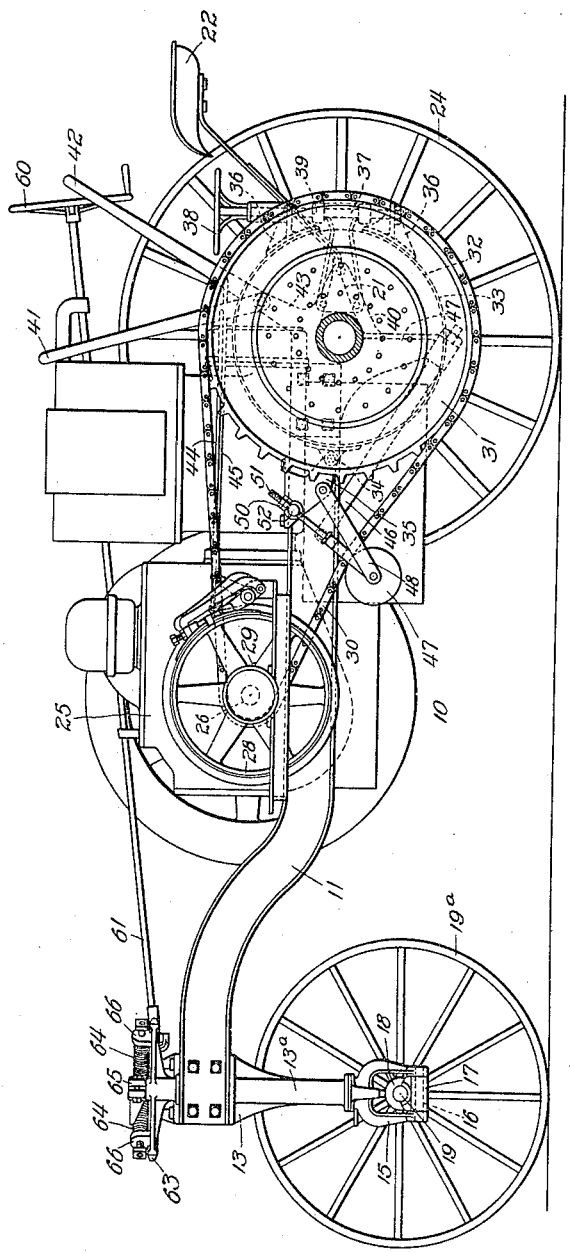
Figure 1 is a side elevation of a tractor embodying our invention.

The various novel features of our invention will be apparent from the following description and drawings, and will be particularly set forth in the appended claims.

This tractor 10 includes a frame having side members 11 and 12, the front portions of which converge forwardly and are raised relative to the rear portions, said front portions terminating in a shaft support 13, in the tubular part 13ª of which is movably mounted a shaft 14, having integrally formed at its lower end a fork member 15 provided with openings adapted to receive a pin 16 passing through said openings and also through an opening in the sleeve portion 17 of a member 18 mounted on the front axle 19 of the tractor. By means of this arrangement it will be apparent that irregularities in the road or surface over which the tractor travels will not be transmitted to any great degree from the wheels 19ª to the tractor frame. The side frame members 11 and 12 are connected at their rear portions by a rear axle sleeve member 20 having a bracket 21 formed integrally therewith, to which are secured an operator's seat 22 and a foot rest 23. Passing through the rear axle sleeve member is a suitable axle, on the ends of which are mounted traction wheels 24.

Mounted upon the frame of the tractor is a suitable engine 25, having a crank shaft 26, to which is secured a pair of transmission clutch pulleys 27 and 28, which are operatively connected with a sprocket wheel 29 mounted on said crank shaft and having a chain 30 passing around said sprocket wheel and also around a larger sprocket wheel 31 which is operatively connected through suitable mechanism to the rear axle. Formed integrally with the large sprocket wheel 31 is a brake flange 32, around which is located a brake band 33 pivotally supported at 34 by a bracket 35 secured to the side frame member 11. Secured to the ends of the brake band are the memebrs 36, through which passes an operating screw 37, having an operating handle 38 for applying or loosening the brake band with respect to the brake flange. The operating screw 37 passes through and is supported in a bracket 39, which is secured to a projection 40 formed integrally with the rear axle sleeve member 20.

Clutch operating levers 41 and 42, which also are pivotally connected to a projection 43 formed integrally with the rear axle sleeve member, are operatively connected through links 44 and 45, respectively, to the transmission clutch pulleys for controlling the forward and backward movements of the tractor. A supporting rod 46, on each side of the tractor, extends between the side frame member and a projection 47, also formed integrally with the rear axle sleeve member 20. The tautness of the chain 30 is regulated by an idler pulley 47 mounted in one end of a lever 48, which is pivotally connected to the bracket 35. This idler may be adjusted for varying the tautness of the chain by adjusting nuts 50 on a rod 51 pivotally connected to the idler 47 and sliding through a supporting rod 52, which is fastened in the bracket 35.

The tractor may be guided manually by manipulating the hand wheel 60, which is operatively connected to the front axle 19 through a rod 61, worm 62, gear 63, springs 64, and arm 65, the latter being rigidly secured to the shaft 14. It will be noted that the springs 64, mounted between lugs 66 on the worm gear and the arm 65, tend to relieve the steering mechanism from jars which otherwise would be transmitted.

The controlling members for the steering mechanism, clutch mechanism for determining the direction of movement of the tractor, and the brake mechanism are all conveniently located with respect to the operator's seat 22, thereby providing a handy arrangement.

By means of the complete arrangement of the tractor as described, a simple, inexpensive, compact and durable tractor is provided, and one which is efficient in operation.

There may be various modifications of the invention other than that here particularly shown and described, and it is our intention to cover all such modifications which do not involve a departure from the spirit and scope of our invention.

What we claim as new is:

1. In a tractor, a frame including side members, a rear axle sleeve member connecting said side members, a brake including a brake band, and brackets secured to one of said side frame members and to said sleeve for supporting said brake band.

2. In a tractor, a frame, an engine thereon, a rear axle, a sprocket wheel operatively connected thereto and having a braking flange, a chain operatively connected to said engine and passing over said sprocket wheel, a bracket connected to said frame, and a brake band supported by said bracket.

3. In a tractor, a frame, an engine having a crank shaft mounted thereon, forward and reverse clutch pulleys operatively connected to said crank shaft, a rear axle sleeve member, an axle therein, a sprocket wheel operatively connected to said axle, a chain operatively connected to said clutch pulleys and passing over said sprocket wheel, and operating levers pivotally mounted on said sleeve member and being operatively connected to said clutch members.

4. In a tractor, a frame including side members, a rear axle member connecting said side frame members, an operator's seat and foot support, brake operating means, and clutch operating means all connected to said axle member.

In testimony whereof we affix our signatures, in the presence of two witnesses.

EDWARD A. JOHNSTON.
EDMUND J. KANE.

Witnesses:
    CHAS. L. BYRON,
    E. W. BURGESS.